INVENTOR.
ERIK BIRGER ERIKSSON
BY
Kane, Dalsimer, Kane,
Sullivan and Smith

June 27, 1972  E. B. ERIKSSON  3,673,024
METHOD FOR THE MANUFACTURE OF ENDLESS DRIVE BELTS
AND CONVEYOR BANDS
Filed March 6, 1969  2 Sheets-Sheet 2
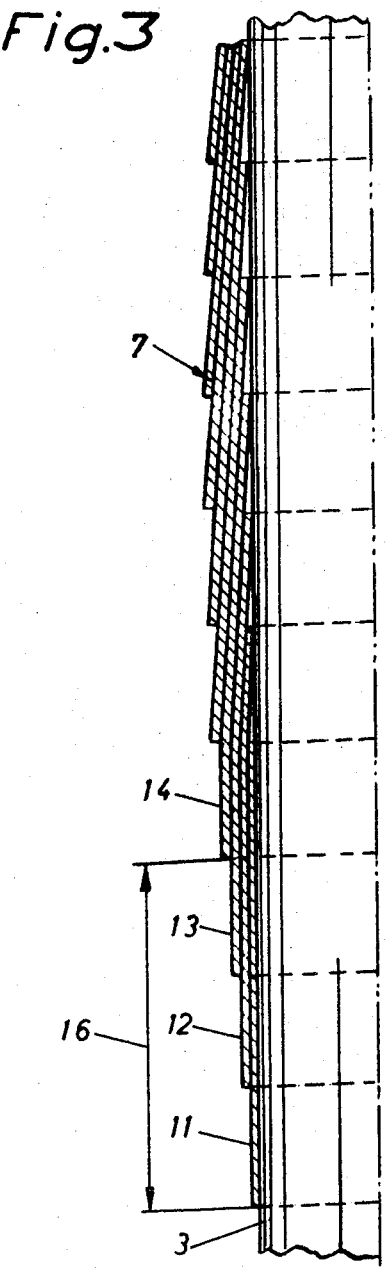
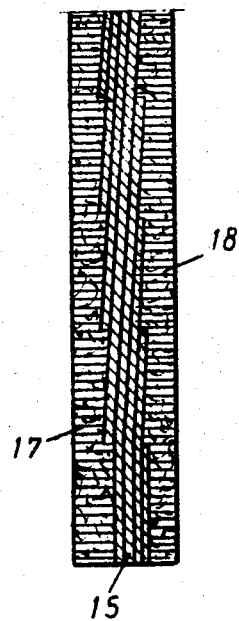
INVENTOR.
ERIK BIRGER ERIKSSON
BY
Kane, Dalsimer, Kane, Sullivan
and Smith

United States Patent Office 3,673,024
Patented June 27, 1972

---

3,673,024
METHOD FOR THE MANUFACTURE OF ENDLESS DRIVE BELTS AND CONVEYOR BANDS
Erik Birger Eriksson, Halmstad, Sweden, assignor to Nordiska Maskinfilt Aktiebolaget, Halmstad, Sweden
Filed Mar. 6, 1969, Ser. No. 804,773
Int. Cl. B29h 7/22
U.S. Cl. 156—137                    10 Claims

ABSTRACT OF THE DISCLOSURE

The invention relates to a method for the manufacture of endless belts and bands. The method is carried out in such a way that a rather narrow bat having fibres orientated essentially in the longitudinal direction is wound over and between two parallel rollers and the web thus obtained is needled in a needling machine. The invention also embraces a machine for carrying such a method into effect.

---

Figure 1:
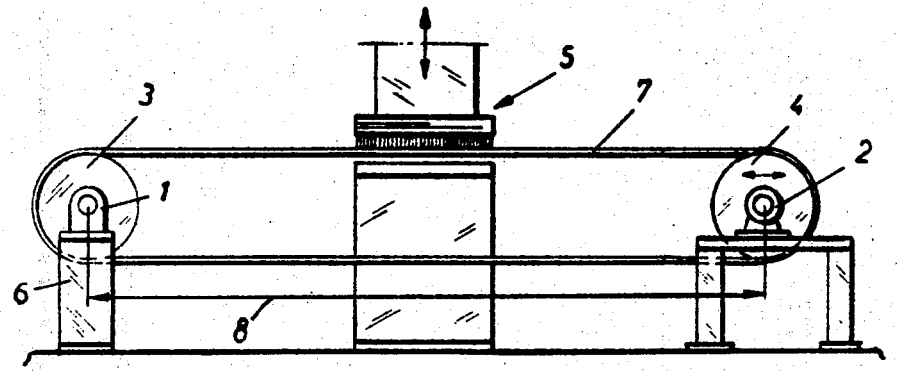

In the manufacture of driving belts and conveyor bands such technics and such materials are used that give the best possible dimension stability in the longitudinal direction. To achieve this experiments have been made with stiff materials such as glass fibres and steel fibres. In spite thereof, one has hitherto not succeeded in obtaining belts and conveyor bands having sufficient dimension stability and good driving qualities. In addition the experiments have only caused an increase of the manufacturing costs of the products.

The present invention which is based on a completely new principle, has for its object to eliminate said drawbacks. The manufacturing method according to the invention is mainly characterised thereby that a long and rather narrow bat comprising one or several layers of carding webs, having the fibres, of which at least some are melt fibres, oriented essentially in the longitudinal direction of the bat, is needled in a needling machine and that the bat after a possible edge cutting or edge beveling is wound straight over or helically over and between two rollers situated at a distance from each other in such a way that the turns of winding completely or only with a part of the width of the bat cover the previous turn of winding, and the endless web thus formed will comprise superposed bat layers which are needled in a needling machine, whereupon a heat treatment is carried out by means of hot air having a temperature which is higher than the softening temperature of the melt fibres such that the melt fibres will adhere to adjacent fibres the heat treatment being carried out with the narrow bat separately and/or with the whole of the endless web.

The endless web thus formed is preferably provided, on one or both sides thereof, with bats having transversely oriented fibres which are needled into the web. Also these bats may contain melt fibres. Finally, the whole endless web provided wtih such bats may be blown through with hot air which gives the web a further increased dimension stability.

The endless web is divided into belts and bands of the desired width. Such driving belts and conveyor bands have a good tensile strength, good dimension stability and good friction qualities and they are cheap to manufacture.

Figure 2:
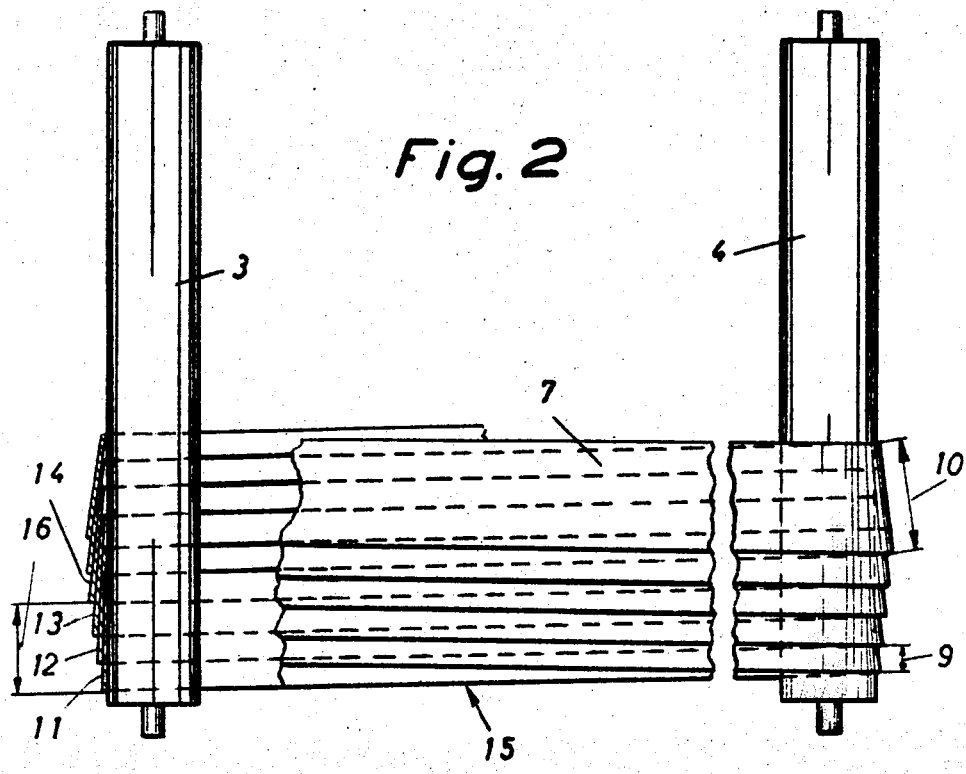

In the following, the invention will be elucidated with reference to the accompanying partly diagrammatical drawings. In the drawings:

FIG. 1 is a side elevation of a machine for carrying into effect the method according to the invention, FIG. 2 is a plan view of the rollers incorporated in the machine shown during the helical winding of the bat web (however, the needling mochine is not shown), FIG. 3 shows on an enlarged scale a section through a part of the helically wound web, and FIG. 4 shows a cross section through the web after the application of fibre webs on both sides, Principally, the manufacture may be divided into three phases.

PHASE 1

In a rather narrow fibre bat in which the fibres have oriented in the longitudinal direction of the bat in any suitably known manner, the fibres are bound to each other in such a way that the bat is given good strength in the longitudinal direction and is made dimensionally stable. In the bat, a fibre blend is used containing a certain amount of fibres having a lower melting point than the rest of the fibres. The amount of melt fibres may vary from 5 to 75% of the whole amount of fibres in the bat. Such a bat having the fibres oriented essentially in the longitudinal direction of the bat, is pre-needled in a needling machine. After this pre-needling operation hot air is blown through the bat and the temperature of the air should be somewhat above the softening point of the melt fibres. Simultaneously, a surface pressure is preferably applied to the bat. Adjacent fibres in the bat will then melt together and be bound to each other such that the latter obtains high strength and good dimension stability. The bat thus formed is then edge trimmed or edge bevelled to a suitable width and rolled up.

PHASE 2

A machine, cf. FIGS. 1 and 2, is used for phase 2 which comprises two rollers 3 and 4 which are parallel to each other and can rotate and which are placed at a certain distance from each other and with a needling machine 5 known per se situated between the rollers. The roller 3 is preferably driven. The bearings 1 of the roller 3 are carried stationarily on a bearing bracket 6 and the bearings 2 of the roller 4 are displaceable in relation to the bearings 1 such that the distance between the rollers 3 and 4 may be varied.

The narrow bat 7 mentioned in the aforegoing is wound over and between the two rollers 3 and 4, the shaft distance 8 between said rollers being chosen in respect to the length of the endless product to be manufactured. The winding operation may be carried out in two different ways thereby that the subsequent layer either completely covers the previous layer or is displaced in lateral direction, so-called helical winding, and in both cases attention is to be paid to it that the new tissue will comprise several layers of bats. Upon such a winding of the bat 7 the separate windings 11, 12, 13, and 14 are needled to each other by the needling machine 5. For the sake of simplicity a helical winding has been chosen for the shown embodiment comprising four layers laterally displaced by exactly a quarter 9 of the complete width 10 of the bat. Thus, a winding turn overlaps a preceding winding turn by three quarters of the hole width 10 of the bat. At the two longitudinal edges of the endless bat web 15 thus formed there is obtained a certain stepping of the bat layers. These edge portions 16 are cut off and discarded. The endless, needled bat web thus obtained is divided in the longitudinal direction to form belts and/or bands with widths suiting the intended purpose.

PHASE 3

In order to increase the transversal strength of the finished product it might be suitable to apply bats 17 and 18 (FIG. 4) on one or both sides of the bat web 15 manufactured according to phase 2, said bats 17 and 18 having transversely oriented fibers. These bats are needled onto the bat 15. However, it is also possible to needle these bats 17 and 18 onto the narrow bat 7 before the latter is wound about and between the rollers 3, 4. However, there are of course other possibilities to obtain transversely oriented fibres in the bat during the manufacture of the same or in later processes.

Also the bats 17 and 18 may contain melt fibres. When hot air is being blown through the web 15 in the way described in the aforegoing an even higher strength in the final product is obtained. Because the fibres in the reeled bat 7 are effectively bound to each other, said bat which may or may not be needled to other bats, has such a high strength and dimension stability that without any subsequent treatment it can be used as a drive belt or a conveyor band. In case an increased fibre binding is desired and thus also a higher strength and dimension stability, the bat web 15 may once more be treated with hot air or possibly synthetic resins may be added such that the fibres are bound more tightly to each other.

The manufacture of bats having longitudinally orientated fibres is carried out according to the method known per se which is used inter alia in the manufacture of milled felts. Thus the web is taken from the carding mill and is deposited on a continuously moving, very long and endless conveyor cloth whereafter a layer of web is being built up and when a sufficient bat thickness is reached the bat 7 thus obtained is edged, trimmed or bevelled and it is possibly pre-needled and/or heat treated and rolled up.

According to another modification of the method the bat 7 may be replaced with a web directly from the carding mill. In the latter case, the bat 15 is built up to a suitable thickness in connection with the reeling. Any pre-needling and/or heat treatment may be performed between the carding mill and the rolling device. The advantage in the latter modification is to be seen therein that in principle one may obtain a bat 7 of interminable length thus eliminating joints.

The bats having transversally oriented fibres are manufactured by a conventional bat applicator.

The invention has made it possible to manufacture in a simple way drive belts and conveyor bands having excellent tensile qualities and a superb dimension stability by the application of coating suiting the purpose in view on the bat web 15 on one or both sides of the same or by means of impregnations, it being also possible to give the belts and bands other desired qualities in the same manner. The products may be modified in many ways with regard to thickness mes compression of the fibres and so on.

The method described in the aforegoing is to be regarded as an example only and it may be modified in many ways within the scope of the appended claims. It is not necessary to blow hot air through the narrow bat 7 immediately as it might be sufficient to blow the hot air only through the endless web 15 manufactured after the helically winding with or without bats 17 and 18. The helically winding device should also comprise a transversing device.

What I claim is:
1. A method for the manufacture of endless drive belts and conveyor bands wherein a long and rather narrow bat comprising one or several layers of carded webs, having its fibres orientated essentially in the longitudinal direction of the bat, containing at least partly melt fibres, to form an endless web is wound straightly or helically over and between two rollers spaced from each other in such a way that each of the winding turns covers the preceding winding turn completely or by only a part of the width of the bat and by needling the layers successively in a needling machine during and after said winding to form an endless web and said melt fibers are adhered to adjacent fibres by heat treatment with hot air having a temperature above the softening temperature of the melt fibres.

2. A method as in claim 1, including the step of edge trimming the bat prior to winding on said rollers.

3. A method as in claim 1, including the step of edge bevelling the bat prior to winding on said rollers.

4. A method as in claim 1, including the step of heat treating the narrow bat prior to winding on said rollers so that melt fibres adhere to adjacent fibres.

5. A method as in claim 1, including the step of heat treating the whole of the endless web so that melt fibres adhere to adjacent fibres.

6. A method as in claim 1, including the step of providing the endless web, on one side, with additional bats having transversely orientated fibres which are needled into the web.

7. A method as in claim 1, including the step of providing the endless web on both sides thereof with additional bats having transversely orientated fibres which are needled into the web.

8. A method as in claim 1, wherein a separate bat having transversely orientated fibres is needled onto the narrow bat prior to winding on said rollers.

9. A method as in claim 1, including using a bat containing 5-75% of melt fibres.

10. A method as in claim 1, including the step of coating the endless web with synthetic resin.

References Cited
UNITED STATES PATENTS 3,031,364    4/1962    Perkins _____ 156—141 X
3,452,506    7/1969    Broerman _____ 156—195 X CARL D. QUARFORTH, Primary Examiner S. J. LECHERT, Jr., Assistant Examiner U.S. Cl. X.R.

156—148, 184, 191, 192, 195, 267, 270, 280, 306